J. S. HIGHFIELD.
MINING OF CLAY AND THE LIKE.
APPLICATION FILED NOV. 7, 1919.
1,366,456.
Patented Jan. 25, 1921.
2 SHEETS—SHEET 1.
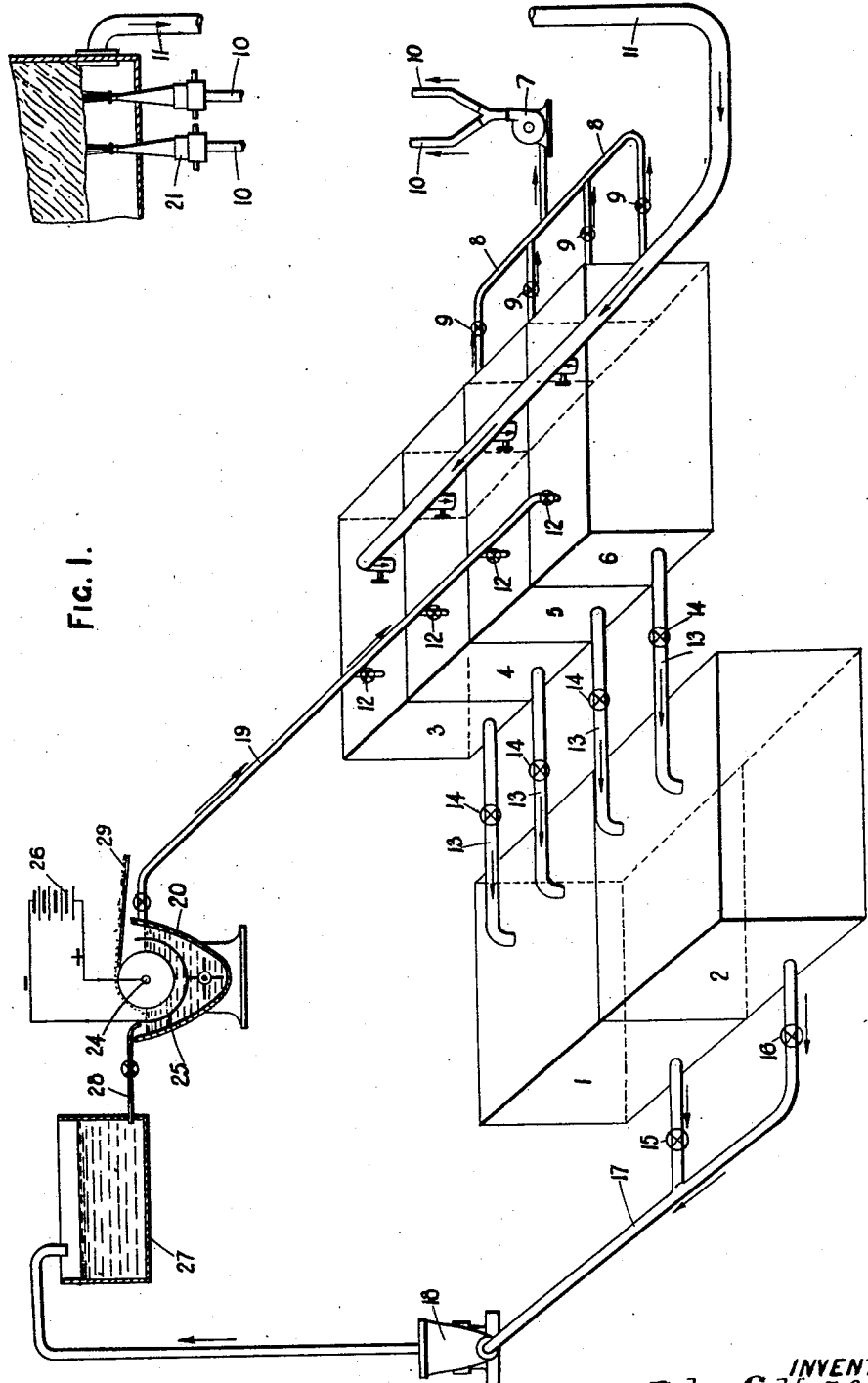
INVENTOR
John S. Highfield
by Eugene C. Brown
Atty.

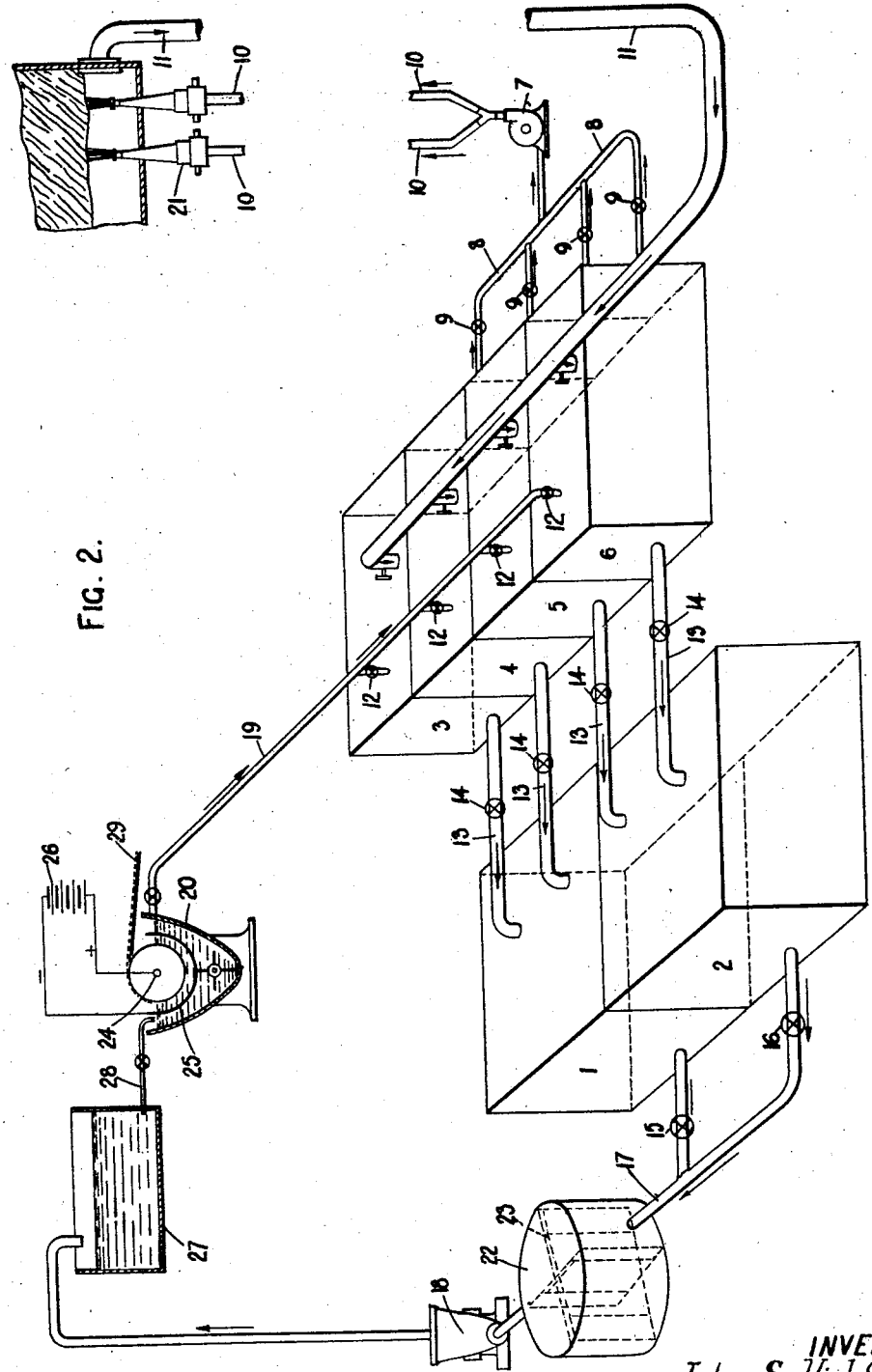

UNITED STATES PATENT OFFICE.

JOHN SOMERVILLE HIGHFIELD, OF LONDON, ENGLAND.

MINING OF CLAY AND THE LIKE.

1,366,456.   Specification of Letters Patent.   Patented Jan. 25, 1921.

Application filed November 7, 1919. Serial No. 336,278.

*To all whom it may concern:*

Be it known that I, JOHN SOMERVILLE HIGHFIELD, a subject of the King of Great Britain, and residing at 36 Victoria street, London, S. W. 1, England, have invented certain new and useful Improvements Relating to the Mining of Clay and the like, of which the following is a specification.

This invention relates to the mining or quarrying of clay and the like, wherein the clay is washed out or mined by water suitably applied. The object of the invention is to provide a method whereby the clay suspension in the water can be substantially increased without thickening the liquor, and consequently without the danger of choking of the valves and so forth of the pumping apparatus.

With the use of a suitable electrolyte, an aqueous suspension of a comparatively thin and liquid consistency can be made containing over 25 per cent., or even as much as 50 per cent. by weight of clay substance, which without an electrolyte would form a slip of a thick cream-like consistency. Only a small quantity, say one-twentieth to one-fifth of one per cent. of the electrolyte, reckoned on the weight of clay substance carried in suspension, is required. This represents the proportion for caustic soda. For heavier electrolytes such as silicate of soda or carbonate of soda, the percentage is correspondingly increased, so that the alkali contained therein is in the same proportion.

The electrolyte such as silicate of soda is added to the water used in the mining operation, and it serves to disperse the particles of clay in the settling pit of the mine or quarry so that for a given density of liquor capable of being pumped and transported, the percentage of clay carried in suspension can be substantially increased. The addition of the electrolyte may be made to the water before it is used in the mining operation, or in the settling pit or the like, according to circumstances. By this method I am enabled to pump up in a given volume of liquor two or even three times as much clay as can be pumped by present methods without the use of an electrolyte. The suspensions made with the electrolyte can be pumped rapidly without risk, and the employment of this invention enables the cost of pumping to be substantially reduced as the total quantity of liquor pumped for a given yield is obviously in approximately inverse proportion to the percentage of clay matter in the suspension.

In carrying the invention into effect I may proceed in the manner hereinafter described.

A series of settling tanks or pits is arranged preferably at the bottom of the quarry. The exact method depends on the quality of the clay and on the method of treatment desired. Most clays contain considerable quantities of silica and undecomposed mineral matter such as feldspar; the mineral matter may be in relatively large pieces or in the form of fine grains. The bulk of this matter may be removed at the bottom of the pit before pumping the clay slip to the surface, or on the other hand, only the coarser material may be removed at the bottom of the pit and the slip containing clay and mineral matter in a finer form pumped to the surface. In the first instance, the tanks or pits can be used singly, but in the second case they require to be used in pairs for example, as follows:—

One of the tanks or pits is filled with the effluent water which is obtained from the surface of a tank after the extraction of the clay, and the necessary quantity of electrolyte, which may be sodium silicate or carbonate, is added. The water from this tank or pit is drawn off by means of a pump, and delivered under considerable pressure to the face of the clay by means of hydraulic nozzles of any suitable known type. Alternatively, the water may be delivered at low pressure, the clay being mined by picking or other mechanical means. A chute is arranged to carry the water back to the pit. The process is continued while the liquor is circulated until the liquor is sufficiently concentrated, containing say 25 per cent. of clay substance. During this process some of the heavier material will settle out in the pit. The liquor is then run or pumped into a second tank or pit where further settling may take place to remove the finer material. The size of the tank or pit is determined by the length of time desired for settlement. When settlement has been carried to the desired extent, the main pump is connected to the second settling tank or pit and the whole of the liquor containing the clay is pumped to the surface for further treatment in any known manner. Alternatively, a main pit may be used from which the pumping is done continuously, this pit being provided with a stirrer running continuously to prevent further settlement; the liquor is then run from the second settling pit into this main pumping pit.

When the process is completed in the first pit, the returned effluent, while pumping from the first series of tanks or pits is being carried out, may be run into a second pit to which the washing pump is connected.

In any case a sufficient number of tanks or pits is used to enable continuous working to be carried out.

At suitable intervals, after the emptying of the settling tanks or pits, the waste mineral matter accumulated therein may be removed. In some clays, the fine silica and other mineral matter is a useful by-product, and three or more settling tanks or pits may be used in a succession so as to grade the matter into various sizes, the heavier material settling in the first pit, and the lighter material in the second, third and fourth pits for example.

The invention is illustrated in the accompanying drawings, wherein Figures 1 and 2 are diagrams showing two somewhat different modes of carrying the invention into effect.

In the arrangements shown in the annexed diagrams, 1 and 2 are main settling tanks or pits, and 3, 4, 5 and 6 are circulating tanks or pits. Any one of the tanks 3 to 6 can be connected to a pump 7 by means of pipes 8 and cocks 9. The pump 7 delivers the liquor through pipes 10 to hydraulic nozzles 21 of any suitable known type used for mining or washing out the clay at the face. The resulting liquor containing the clay matter in suspension is carried away by suitable chutes or channels to the duct 11 which leads through branching ducts back to any one of the tanks 3 to 6. The tanks 3 to 6 are used successively, the liquor being circulated from tank 3 for example, through pump 7 to the clay face, and back through duct 11 to the same tank, until it contains a suspension of clay matter of the full desired concentration. Then the circulation is continued, using tank 4, and so on, while tank 3 is discharged through its cock 14 and duct 13 into the main settling tank 1. Later, the suspension collected in tank 4 is also discharged into pit 1, and is left to settle therein. The suspensions collected previously in tanks 5 and 6 have been settling meanwhile in pit or tank 2, and before tank 5 requires to be discharged again, the liquor from pit 2 is drawn off through cock 16 and duct 17 to main pump 18 which delivers it to the treating plant. Ultimately, after settling for a suitable length of time, the suspension from pit 1 is discharged through cock 15, duct 17 and pump 18 to the treating plant. This plant may be of the electro-osmotic type in which the suspended clay substance is deposited by an electric current, or it may be of any other known type. The plant shown in the drawing is of the electro-osmotic type and comprises a trough 20 in which a metal cylinder 24 revolves. Concentric with and at some distance from the cylinder 24 a perforated metal electrode 25 is arranged, said electrode being connected to the negative pole of an electric generator 26, while the cylinder is connected to the positive pole thereof. The clay slip is pumped by pump 18 into the tank 27 from which it is fed through pipe 28 into the trough 20. Clay particles being electro-negative are attracted to and collected on the anode cylinder 24, the clay being removed therefrom by means of a fixed scraper 29. The impoverished liquor from this plant is returned to the circulating tanks, after they have been emptied into the pits 1 or 2 respectively, through a duct 19 and cocks 12.

Fig. 2 shows a similar arrangement to that just described but includes a main pit 21 which is used when pumping is to be done continuously. A stirrer 22 is arranged in the tank and runs continuously in order to prevent settlement. With this arrangement, the liquor is run from the pits 1 and 2 alternately into the main pit 21, and then pumped into 20.

If the treating plant 20 is not an electrolytic one, the residual sodium silicate or the like used for the electrolyte, will generally be returned unaltered in the effluent in pipe 19, and will only require an addition of a comparatively small amount of further silicate to bring it up to the required strength for re-use. If the plant 20 is an electrolytic one, and silicate of soda is used as the electrolyte, only the alkaline base will be returned in the effluent liquor, and the percentage of silica will require to be increased for example by adding more silicate of soda containing a maximum of silica in order to restore the electrolyte to the proper strength. A somewhat similar result may be secured by using peat water which contains humic acid, and which reacts with the alkali in the effluent to give a suitable electrolyte. In general, the effluent when restored to its proper strength with the electrolyte, will be just alkaline to phenol phthalein. When starting the plant at first, it will generally be correct to use about 10 pounds of silicate to 1,000 gallons of water in order to make up a liquor which contains the required proportion of electrolyte. The proportion will readily be determined in any particular case by practical tests with the clay matter in order to ascertain what proportion can be retained in suspension in the liquor, and what its consistency is.

It is important in order to avoid dilution of the electrolyte, to prevent the ingress of surface drainage water at the pits, particularly in wet weather and, where necessary, the pits are covered or other precautions are taken to prevent the ingress of such water, the mine being drained by means of a drainage pit or pump drawing from a pit or tank reserved for this purpose preferably situated at a level below the other pits. Owing to the increased density of the electrolyte and circulating slip as compared with water as generally used hitherto, the mining operation with this slip is more energetic and rapid than with the usual fluid. The electrolyte also tends to render the clay matter immediately capable of being washed away in the liquor, the chemical dissolving action thus facilitating the mechanical washing action. The quartz washed out with the clay matter tends to separate out more quickly than with the usual washing waters and a cleaner liquor is obtained, with less risk of fouling the pumps with foreign matter.

Another great point in the process is that whereas the amount of water used up per ton of clay mined in the processes hitherto usual, has been about 30 tons, i. e. this is the normal wastage of water, in the new process the amount used up is only about 4 tons or less of water per ton of clay mined. This is due to the increased concentration and the reduced pumping and so forth. The new process is available therefore in many places where clay mining has not been profitable hitherto owing to the scarcity of water or the expense of conveying or pumping it to such places.

Having thus described my invention what I claim as new and desire to secure by Letters Patent is:—

1. A method of mining clay consisting in forcing a liquid in a stream against a clay face, collecting the resultant liquor in a collecting vessel and returning said liquor in the stream against the clay face until a desired degree of concentration of clay suspension is attained in the liquor, allowing the resultant liquor to settle, and then pumping the liquor to a treating plant for extracting the clay from the liquor, the liquor prior to the pumping operation being rendered electrolytic by means of a very small percentage of an electrolyte adapted to insure the uniform dispersion of the clay particles in the liquor, whereby the suspension is rendered substantially thinner for a given percentage of clay carried in the liquor.

2. A method of mining clay consisting in forcing a liquid in a stream against a clay face, collecting the resultant liquor in a collecting vessel and returning said liquor in the stream against the clay face until a desired degree of concentration of clay suspension is attained in the liquor, passing the liquor into a settling plant, adding a relatively small precentage of an electrolyte to the liquor, allowing the liquor to settle, and then pumping the liquor to a treating plant for extracting the clay from the liquor.

JOHN SOMERVILLE HIGHFIELD.